Patented Jan. 13, 1942

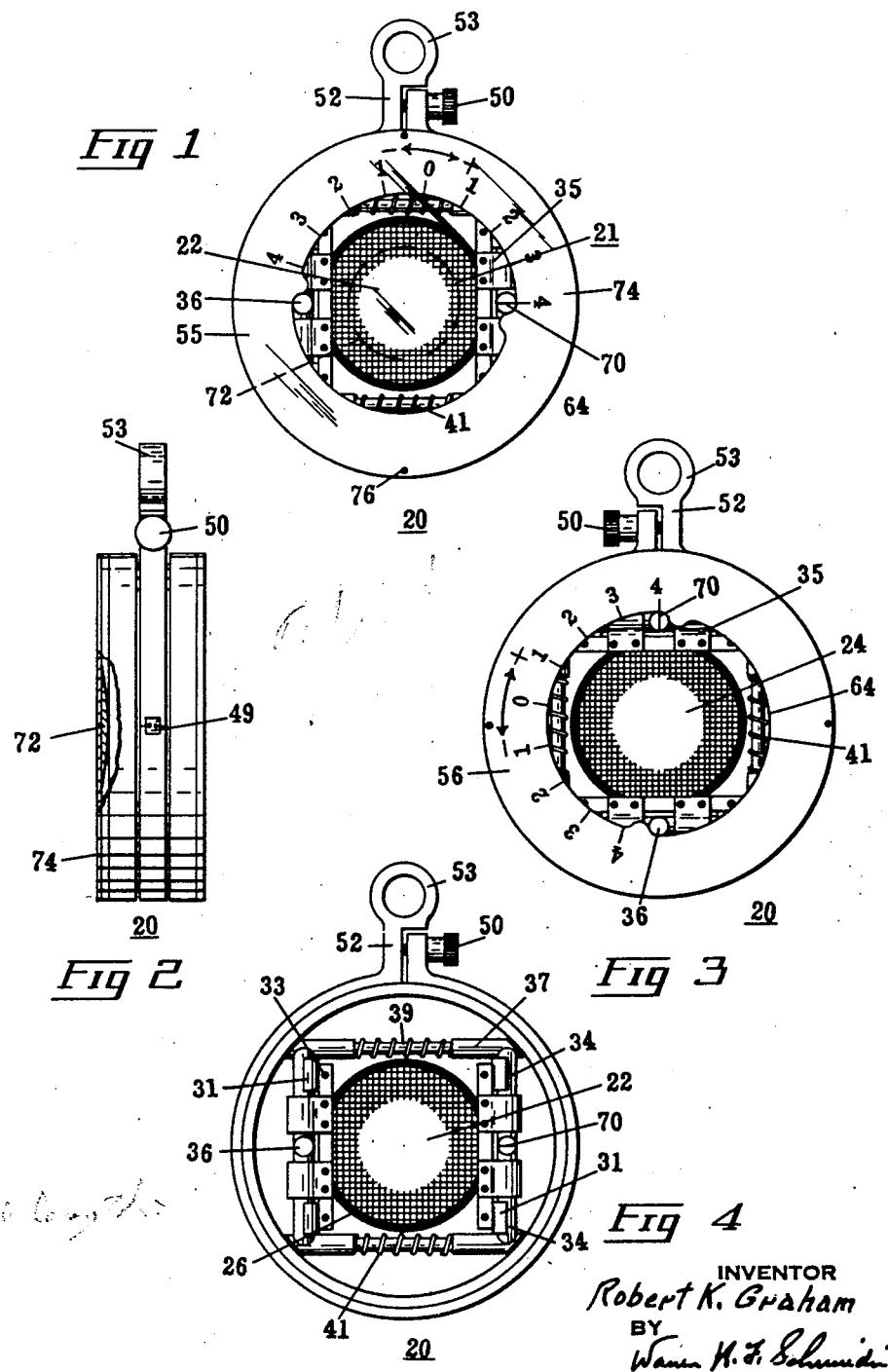
Jan. 13, 1942.   R. K. GRAHAM   2,269,905
OPTICAL INSTRUMENT
Filed July 7, 1938   2 Sheets-Sheet 1

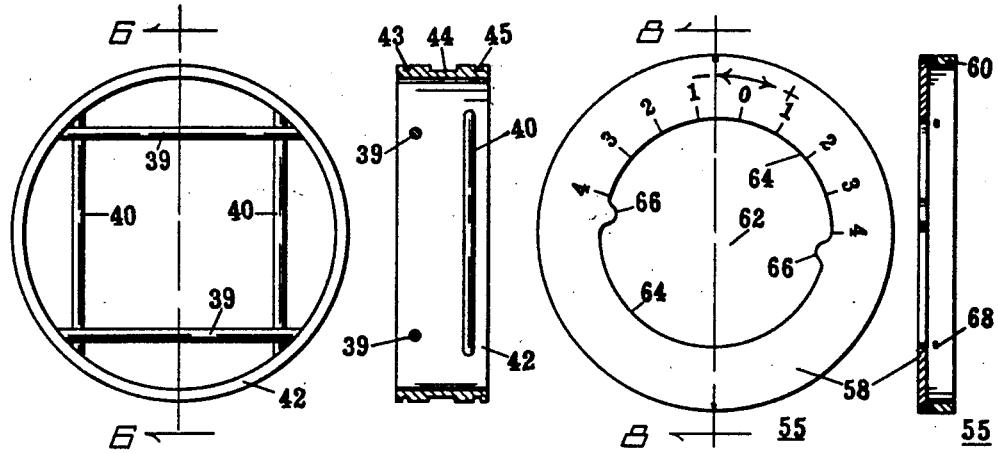

2,269,905

UNITED STATES PATENT OFFICE 2,269,905

OPTICAL INSTRUMENT

Robert K. Graham, Lansing, Mich.

Application July 7, 1938, Serial No. 217,885

9 Claims. (Cl. 88—57)

The present invention relates to optical instruments and more particularly to one constituting a lens of variable focus, said lens being variable and capable of selective adjustment for producing any one of a plurality of dioptric effects.

One of the objects of the present invention is to provide a lens which includes opposed walls of transparent material having a transparent refracting fluid contained therebetween, one of said walls being flexible whereby the wall can be selectively bowed for changing the dioptric power of the cylindrical lens thus obtained.

In carrying out the above object it is a further object of the invention to provide an indicating device, to be associated with the bowing means, for indicating the degree of curvature of the flexible wall or the dioptric effect produced by the bowing of the walls.

It is another object of the invention to provide a lens comprising opposed walls of transparent material having a transparent fluid therebetween, each of said walls being flexible and capable of being bowed on axes at substantially ninety degrees to one another, whereby the walls can be selectively and individually bowed to obtain dioptric effects attainable from crossed optical cylinder segments of various curvatures.

In carrying out the above object it is a further object to provide indicating devices to be associated with the bowing means for indicating the degree of curvature of the individual flexible walls or the dioptric effect produced by the bowing of the walls.

It is another object of the invention to provide either of the aforementioned types of adjustable lenses with an associated lens of fixed dioptric power, the total effective power of the combination of lenses being variable within limits by selective manipulation of the adjustable lens.

It is another object of the invention to provide the flexible wall, or walls, of the adjustable lens with cam elements relatively movable with respect to one another, indicating means being associated with said cam elements, and movable therewith, for indicating the degree or degrees of curvature of the flexible wall, or walls, or for indicating the dioptric effect produced by the degree or degrees of curvature, of the wall or walls.

It is a still further object of the invention to provide an adjustable mounting for the instrument and to provide indicia on the frame of the instrument to register with the mounting for indicating the angle of the axes of the cylinder segments produced by the bowing of the lens or lenses.

Other and further objects and advantages will be apparent from the following description, reference being had to the accompanying drawings wherein a preferred form of embodiment of the present invention is clearly shown.

In the drawings:

Fig. 1 is a view of one side of an optical instrument embodying an adjustable lens therein;

Fig. 2 is a side view of the instrument shown in Fig. 1, a portion thereof being broken away to show the fixed lens;

Fig. 3 is a view of the instrument showing the opposite side of that shown in Fig. 1;

Fig. 4 is a view of the instrument looking in the same direction as in Fig. 1 but with the indicia and adjustment cap removed;

Fig. 5 is a view of the supporting frame for the adjustable lens;

Fig. 6 is a view in section taken on line 6—6 of Fig. 5;

Fig. 7 is a front view of one of the indicia caps including the camming surfaces used in the adjustment of the lens;

Fig. 8 is a view taken on line 8—8 of Fig. 7;

Fig. 9 is a view of the instrument mounting clamp;

Fig. 10 is a view of the adjustable lens assembly;

Fig. 11 is a view taken on line 11—11 of Fig. 10, the flexible walls of the lens being bowed;

Fig. 12 is a view on a larger scale and taken on line 12—12 of Fig. 10, flexible walls of the lens being bowed;

Fig. 13 is a front view of one of the assemblies used in connection with the lens;

Fig. 14 is a side view of the assembly shown in Fig. 13;

Fig. 15 is a view of one of the saddles used in connection with the lens;

Fig. 16 is an end view of the saddle shown in Fig. 15; and,

Fig. 17 is a view in perspective of a clamp member used in the assembly.

Referring to the drawings, the instrument 20 includes a lens 21, comprising two flexible transparent walls 22 and 24 containing a transparent fluid therebetween. It is to be understood that where the word "fluid" is used herein, it is to include, not only liquids and gases, but also jellies. The walls 22 and 24 are adapted to be selectively and individually bowed to form, for example, a cylinder segment or segments of any dioptric power from zero to a maximum obtained by the instrument, spheric lens of similar power range or any desired combination of crossed cylindrical segments within the range of adjustment of the lenses.

The lens surfaces 22 and 24 are preferably fabricated from mica, or thin glass which substances are substantially impervious to water or solutions thereof, such fluids being preferably used as the transparent fluid previously mentioned. The lens members or walls 22 and 24 are so designed, shaped and constructed that when they are bowed, a substantially perfect cylindrical arc will be obtained. The edges of the lens walls 22 and 24 are joined by a tubular section of thin highly flexible rubber 26, or the like, to form with the walls 22 and 24 an expansible and contractable chamber 28 for containing the transparent fluid. The rubber section 26 is preferably folded over all of the edges of the lens walls 22 and 24 and suitably cemented thereto as at 27 with, for example, marine glue. In this manner a fluid tight chamber 28 is formed by and between the walls 22 and 24 and the rubber section 26.

The lens wall 22 is provided with metallic strips 30 disposed on the outside of two edges of the wall 22 and these strips 30 are each provided with a pair of saddles 31 formed integrally therewith. Metallic strips 32 are also provided to cooperate with the strips 30 for mounting the wall 22, one of the strips 32 abutting the inside of the wall 22 and the other of the strips 32 abutting the member 30. A suitable number of screws 33 pass through one of the members 32 and the member 30 and are threaded into the other strip 32. A similar strip arrangement is provided for the opposite edge of the wall 22, the second strip arrangement being parallel to the first for reasons to be set forth hereinafter. The strip assemblies reinforce the surface 22 on two edges thereof and also function to further hold, or clamp, the rubber section 26 to the wall 22. The lens wall 24 is provided with similar strip and saddle assemblies but at ninety degrees to those of the wall 22. In other words each wall 22 and 24 is provided with strip assemblies on two opposite edges thereof and the strips for the wall 22 may extend vertically while the strips for the surface 24 may extend horizontally. The integrally formed saddles 31 are yoke shaped (see Figs. 15 and 16) and are disposed at each end of one edge of the members 30. The centers of saddles 31 are preferably offset from the plane of the associated lens surface (as shown in Fig. 12). Rods 34, of suitable diameter to conform with the shape of the inner surface of the saddles 31, (see Fig. 12) are provided, and hooks 35 hold saddles 31 in contact with rods 34. The hooks 35 are also attached to the strips 32 by the screws 33 and maintain the rods 34 in hinged association with the lens walls through the strips 32 so that the lens walls 22 and 24 can be flexed or bowed with respect to the rods 34. Two such rods 34 are provided for each of the walls 22 and 24. Each of the rods 34 carries, at or near the middle of its length, an outwardly extending stud 36. These studs are soldered, brazed or welded to the rods 34. The function of the studs 36 will be explained in detail hereinafter.

Each end of the four rods 34 is suitably secured, as by soldering, brazing or welding, to a tubular sleeve 37, disposed at right angles to the longitudinal axis of the rod, to form an adjusting assembly 38 as shown in Figs. 13 and 14. Four such assemblies 38 are utilized. The lens walls 22 and 24 and the associated parts hereinbefore described may be termed a lens assembly 41', as shown in Fig. 10. Each of the sleeves 37, associated with lens wall 22, is adapted to slide on one of two stationary rods 39, (see Fig. 5) likewise each of the sleeves 37, associated with lens wall 24, is adapted to slide on one of the two stationary rods 40. Compression springs 41 are disposed around the rods 39 and 40 between the sleeves 37 so that the sleeves 37 are constantly urged outwardly and toward extended position at the outer ends of rods 39 and 40.

The lens walls may be bowed inwardly or outwardly but in the present illustration, the mechanism is arranged so that lens walls 22 and 24 are adapted to be bowed inwardly, i. e., toward one another, each forming in effect a concave cylinder segment. The bowing of the walls on axes displaced ninety degrees, with respect to one another, produces in effect crossed cylinder segments. Due to the fact that the movements of rod 34 of each assembly 38 are in a plane beyond the wall 22 or 24, movement of a pair of assemblies 38 toward one another causes the associated lens wall to be bowed since force is applied to the walls by the rods 34 through the saddles 31, strips 30 and 32. Likewise when the rods are moved away from one another, by the springs 41, the hooks 35 pull on the lens walls through the strips 30 and 32 to positively move the lens walls 22 and 24 toward plano positions. The width of the walls decrease progressively from the center to those edges with which it is attached to the strips 30. These varying widths progressively increase the relative flexibility of the walls toward said edges whereby, when a wall is bowed, a segment is formed which more closely approximating a segment of a cylinder throughout a large central area of the wall.

The lens assembly 41' is arranged to be supported within a circular frame 42, shown in Fig. 5. This frame carries the rods 39 and 40. The frame 42 is provided with three circumferential grooves 43, 44 and 45 on the outer surface thereof. The groove 44 is wider than grooves 43 and 45 and is utilized to receive a clamp 46 which fits snugly within said groove. The clamp 46 provides a handle for the instrument, or a support therefor when the instrument is to be fixedly positioned. The clamp 46 comprises a split ring 47 having an opening 48 forming a window for viewing a scale 49 marked on the bottom of groove 44 to show the axis of the cylinders. A thumb screw 50 passes through an extending part 51 and threads into an extending part 52. The screw 50 is used to tighten the clamp 47 to secure the frame 46 in adjusted position. The upper end of the extending portion 52 terminates in an annular portion 53, which can be passed over a rod and adjustably held in position on the rod by any suitable means.

Two adjustment caps 55 and 56 of similar shape and dimensions are provided and carry suitable indicia thereon. Each cap 55 and 56 includes a face plate 58 and a ring 60. The front faces of the caps 55 and 56 are cut away as at 62 to form two camming surfaces 64 at the edges of the cut away portion, which surfaces 64 terminate in stops 66. The caps 55 and 56 fit snugly over the frame 42 and are held thereto by a suitable number of retaining screws or pins 68 which pass through the ring portions 60 of the caps and extend into the grooves 43 and 45. In this manner the caps 55 and 56 can be rotated with respect to the frame 42 but cannot be removed therefrom unless screws or pins 68 are first removed.

The studs 36 extend through the openings 62 in the caps and since these studs are forced outwardly by springs 41, the studs ride on the camming surfaces 64. It is apparent that by rotational manipulation of either of the caps 55 or 56 that the associated studs 36 will be moved simultaneously toward one another or simultaneously away from one another depending upon the direction of rotation of the caps due to the changing diameter of the openings 62. Thus the associated adjusting assemblies 38 slide against the springs 41 to vary the bow of the lens walls 22 and 24 thus changing the refractive power of the lens. The pitch of the camming surfaces 64 is preferably sufficiently slight so that the bowing of the lenses will not be too rapid and a gradual adjustment of the walls 22 and 24 may be obtained.

One of the associated studs 36 of each of the lens surfaces 22 and 24 is provided with a line 70 on the top thereof to act as an indicator for registering with the indicia on the associated adjustment cap. Thus either lens wall may be selectively bowed and the vergence effect of adjustment thereof may be observed directly from the calibrated indicia plate. Preferably the lens walls 22 and 24 are adjusted and the indicia divisions are calibrated so that the indicated adjustment of the lens reads directly in diopters or some other standard unit of optical measurement.

It is to be understood that in the broad aspect of the present invention, parallel rays may be made to diverge or converge but in the present disclosure, the lens walls 22 and 24 are bowed inwardly and therefore cooperate with the fluid between them to cause the parallel rays to diverge. In order to obtain plus or minus dioptric effects with this type of instrument, I provide a lens 72 of fixed dioptric power which is disposed in optical alignment with the adjustable lens 21. In the embodiment illustrated, the fixed lens is of the plano-convex type and has a dioptric effect of approximately one-half and of opposite sign of that of the adjustable lens 21 when the walls 22 and 24 are bowed for maximum refractive power. The lens 72 is cemented or otherwise secured to a circular glass plate 74 which plate 74 is cemented or secured by screws 76 to the adjustable cap 55.

It is apparent that when the walls 22 and 24 are bowed to less than maximum, the resultant dioptric effect is the algebraic addition of the dioptric effect of lens 72 and lens 21. At one point of adjustment of lens 21, i. e., an adjustment intermediate the parallel position of the walls 22 and 24 and the maximum bowed position of the walls, the resultant dioptric effect of the combined lenses is zero, and, adjustments on either side of this intermediate point will give plus or minus dioptric effects.

If desired the lens surfaces 22 and 24 can be masked by a suitable opaque paint, or by sand blasting, etc., as at 80 so that only a portion of the surfaces remain transparent. These portions, 80, are preferably circular in shape and of slightly less diameter than the fixed lens 72 and their centers are aligned with the center of lens 72.

From the foregoing it will be observed that the present invention provides an adjustable lens comprising two flexible lens surfaces 22 and 24 which can be selectively bowed to the form of cylindrical segments in planes of ninety degrees with respect to one another and which gives the resultant effect of crossed optical cylindrical segments. The surfaces can be bowed simultaneously or individually to obtain the particular adjustments desired. The lens is simple and inexpensive and can be used to advantage in ophthalmic measurements, treatments, scientific instruments, or, in fact, anywhere that an adjustable lens is required.

While the form of embodiment of the present invention as herein disclosed constitutes a preferred form, it is to be understood that other forms might be adopted, all coming within the scope of the claims which follow.

I claim:

1. An instrument for measuring optical defects including means forming a frame; a lens supported by the frame, said lens including opposed transparent walls; a transparent fluid having an index of refraction disposed between the walls, one of said walls being flexible and one edge thereof being movable toward and away from the opposite edge thereof for flexing said wall to form substantially a segment of a cylinder of any desired diameter, within limits, by selectively positioning the said one edge with respect to the opposite edge; a cam follower operatively connected with said edge; a cam movably mounted on the frame; means yieldingly urging said cam follower and cam in cooperative engagement with one another, the pitch of the cam being such that the cam is immovable by the cam follower when the cam moves the said one edge to a selected position; and means for indicating the dioptric effect of said flexing.

2. An instrument for measuring optical defects including means forming a frame; a lens supported by the frame, said lens including two opposed transparent walls; a transparent fluid having a refraction index disposed between the walls, one of said walls being flexible and the opposite edges thereof being movable toward and away from one another for flexing said wall to form substantially a segment of a cylinder of any desired dimension, within limits, by selectively positioning said opposite edges with respect to one another; a cam follower operatively connected with each of said opposite edges; a member movably mounted on the frame and having camming surfaces engaging said cam followers; means yieldingly urging the cam followers and the cams toward one another, the pitch of the camming surfaces being such that the movable member is immovable by the cam followers when the said opposite edges are moved to a selected position by the member; and means for indicating the dioptric effect of said flexing.

3. An instrument for measuring optical defects comprising in combination, means forming a frame having an opening therethrough; a lens supported by the frame in alignment with the opening, said lens including opposed, transparent walls; a transparent fluid having a refraction index disposed between the walls, one of said walls being flexible and opposite edges of the flexible wall being movable toward and away from one another to flex said wall substantially in the form of a segment of a cylinder of any desired diameter, within limits; a cam member movably mounted on said frame, said member being movable in an arc about the axis of the lens, said member having camming surfaces; and means for maintaining the followers in engagement with the cam surfaces, said camming surfaces being adapted to cause the followers to move simultaneously toward and away from one another when the cam member is rotated in opposite directions.

4. An instrument for measuring optical defects including, means forming a frame having a cylindrical section, said section having an axial opening therethrough, an adjustable lens mounted in alignment with the opening through the cylindrical section, said lens having a flexible wall and one edge thereof being movable toward the opposite edge for adjusting the lens; a cam follower operatively connected with the movable edge; an annular member rotatably mounted on the cylindrical section of the frame and concentric therewith, said member having a cam surface engaging the cam follower; and means for maintaining the cam and cam follower in engagement.

5. An instrument for measuring optical defects including means forming a frame having a cylindrical section, said section having an axial opening therethrough, an adjustable lens mounted in alignment with the opening through the cylindrical section, said lens having a flexible wall and one edge thereof being movable toward the opposite edge for adjusting the lens; a cam follower operatively connected with the movable edge; an annular member rotatably mounted on the cylindrical section of the frame and concentric therewith, the inner edge of said annular member forming a camming surface for engaging the cam follower; and means for maintaining the cam and cam follower in engagement.

6. An adjustable lens comprising in combination, a frame, two opposed transparent flexible walls; a part connected with one of the walls, said part extending outwardly beyond the plane of the surface of said one wall when the latter is flat, a transparent fluid having a refraction index interposed between the walls; a cam member movably supported on the frame; a cam follower engaging the cam; means for maintaining the cam and follower in engagement; and means for supporting the walls in the frame, said means including a swivel connection between said part and the cam follower for causing the one edge to be flexed and moved toward the opposite edge of the wall when the cam member is moved in one direction.

7. An optical instrument comprising a frame member having an opening therethrough; a lens in the opening including two opposed transparent walls forming the surfaces of the lens, one of said walls being flexible and having an edge movable toward an opposite edge for bowing the wall; guide means extending transversely with respect to the axis of the lens and adjacent an edge of the flexible wall; a member slidable along the guide means; a part extending outwardly beyond the surface of the flexible wall, said part and member being connected by a swivel connection; and a movable cam engaging the member for causing the member to be slid along the guide means when the cam is moved; and spring means for biasing the said member into engagement with the cam.

8. An adjustable lens, comprising: a chamber including opposed walls formed of transparent material, one of said walls being flexible and one edge thereof being adjustably movable toward and away from the opposite edge thereof to effect flexure of said wall into the form of a segment of a cylinder adjustable within a range of desired curvatures, said flexible wall progressively decreasing in width and resistance to such curving flexure from its center toward each of its said opposite edges whereby substantially geometrical cylindricity of said segment is inherently realized through the recited simple adjustable spacing movements of its said opposite edges, and a body of light-refractive fluid disposed between said walls and constituting the adjustable lens element of the structure.

9. An adjustable lens, comprising: a chamber including opposed walls formed of transparent material, one of said walls being flexible and one edge thereof being adjustably movable toward and away from the opposite edge thereof to effect flexure of said wall into the form of a segment of a cylinder adjustable within a range of desired curvatures, said flexible wall progressively decreasing in its resistance to such curving flexure from its center toward each of its said opposite edges whereby substantially geometrical cylindricity of said segment is inherently realized through the recited simple adjustable spacing movements of its said opposite edges, and a body of light-refractive fluid disposed between said walls and constituting the adjustable lens element of the structure.

ROBERT K. GRAHAM.